(12) United States Patent
Dearman

(10) Patent No.: US 12,162,583 B2
(45) Date of Patent: Dec. 10, 2024

(54) UNMANNED AERIAL VEHICLE FOR ANTI-AIRCRAFT APPLICATIONS

(71) Applicant: Bell Textron Inc., Fort Worth, TX (US)

(72) Inventor: Michael Dean Dearman, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 217 days.

(21) Appl. No.: 17/094,608

(22) Filed: Nov. 10, 2020

(65) Prior Publication Data

US 2022/0144426 A1    May 12, 2022

(51) Int. Cl.
| | |
|---|---|
| B64C 39/08 | (2006.01) |
| B64C 29/02 | (2006.01) |
| B64U 10/20 | (2023.01) |
| B64U 30/10 | (2023.01) |
| B64U 30/20 | (2023.01) |
| B64U 50/13 | (2023.01) |
| B64U 50/15 | (2023.01) |
| B64U 101/15 | (2023.01) |

(52) U.S. Cl.
CPC ............. *B64C 39/08* (2013.01); *B64C 29/02* (2013.01); *B64U 10/20* (2023.01); *B64U 30/10* (2023.01); *B64U 30/20* (2023.01); *B64U 50/13* (2023.01); *B64U 50/15* (2023.01); *B64U 2101/15* (2023.01); *B64U 2201/20* (2023.01)

(58) Field of Classification Search
CPC ......... B64C 29/02; B64C 37/02; B64C 39/08; B64C 2201/04; B64C 2201/042; B64C 2201/10; B64C 2201/108; B64D 27/02; B64D 27/26
See application file for complete search history.

(56) References Cited

U.S. PATENT DOCUMENTS

| | | | |
|---|---|---|---|
| 9,630,712 B1* | 4/2017 | Carmack | B64C 37/02 |
| 2006/0027701 A1* | 2/2006 | Eglin | B64C 27/001 244/17.11 |
| 2009/0127376 A1* | 5/2009 | Gomez | B64C 39/024 244/2 |
| 2018/0002016 A1* | 1/2018 | McCullough | B64D 1/22 |
| 2018/0229838 A1* | 8/2018 | Selfridge | B64C 39/022 |
| 2018/0319486 A1* | 11/2018 | Elyashiv | F02K 9/95 |
| 2021/0245876 A1* | 8/2021 | Bianco Mengotti | B64C 39/024 |

* cited by examiner

*Primary Examiner* — Richard Green
*Assistant Examiner* — Ashesh Dangol
(74) *Attorney, Agent, or Firm* — Akona IP PC

(57) ABSTRACT

An anti-aircraft system is described and includes an unmanned aerial vehicle (UAV) comprising a body; a wing connected to the body; and propulsion systems associated with the wing, wherein the propulsion systems comprise pylons releasably connected to opposite ends of the wing such that the propulsion systems may be selectively released from the wing during flight of the UAV.

17 Claims, 11 Drawing Sheets

UNMANNED AERIAL VEHICLE FOR ANTI-AIRCRAFT APPLICATIONS

TECHNICAL FIELD

This disclosure relates in general to the field of unmanned aerial vehicles ("UAVs") and, more particularly, though not exclusively, to UAVs configured for use in anti-aircraft applications.

BACKGROUND

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based, or remote, controller, and a system of communication between the vehicle and controller.

SUMMARY

An anti-aircraft system is described and includes an unmanned aerial vehicle (UAV) comprising a body; a wing connected to the body; and propulsion systems associated with the wing, wherein the propulsion systems comprise pylons releasably connected to opposite ends of the wing such that the propulsion systems may be selectively released from the wing during flight of the UAV.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
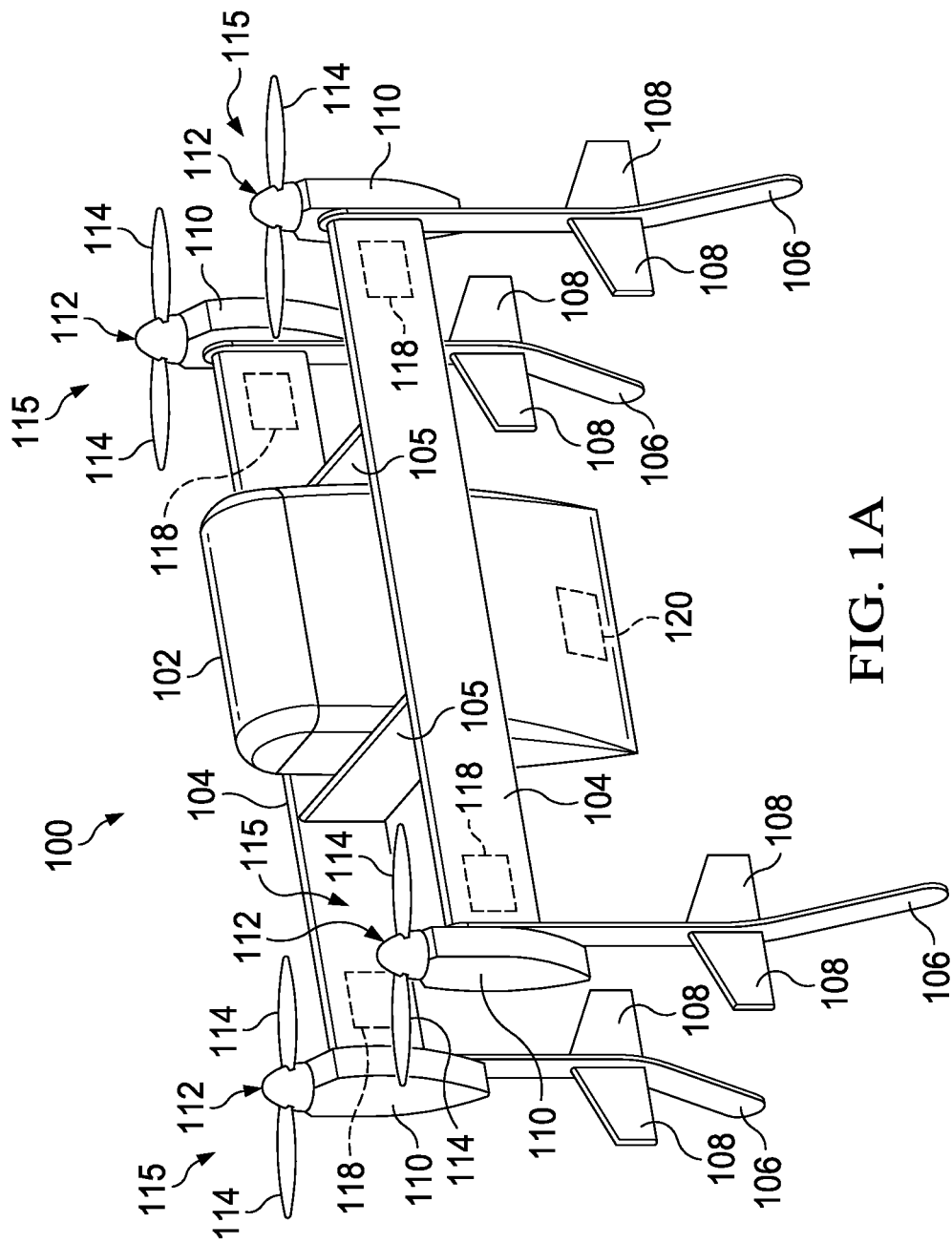
FIGS. 1A and 1B illustrate an example UAV, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect (s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
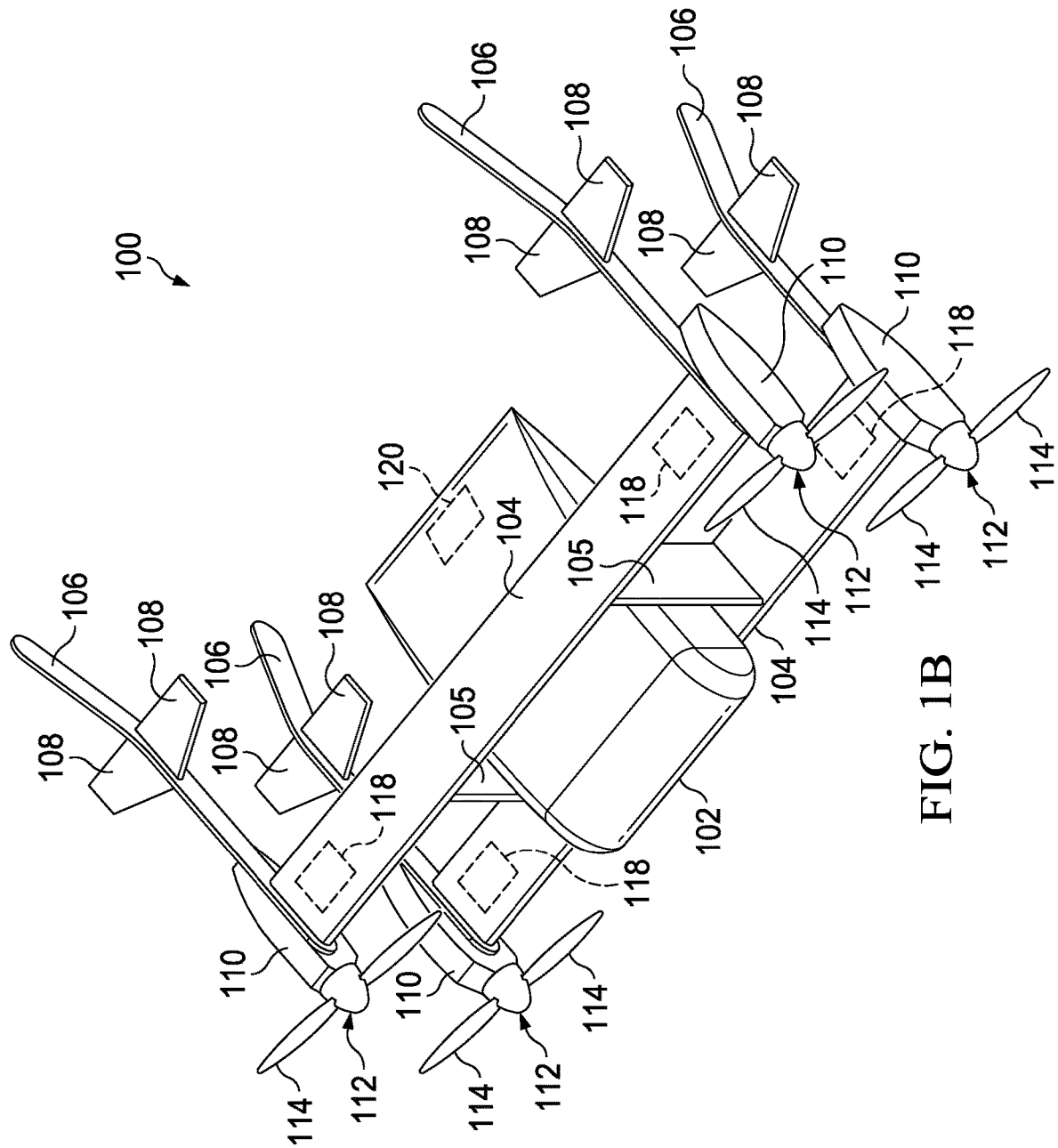

Referring now to FIGS. 1A and 1B, illustrated therein is an example embodiment of an aircraft 100, which in the illustrated examples is generally configured as a vertical takeoff and landing ("VTOL") aircraft. More specifically, aircraft 100 may be an autonomous pod transport ("APT") convertible drone-type aircraft (discussed in further detail below) that is operable in different flight modes including a helicopter mode (as shown in FIG. 1A) and an airplane mode (as shown in FIG. 1B). In helicopter mode, aircraft 100 may be capable of various flight maneuvers including, but not limited to, vertical takeoff from and landing to one or more landing zone(s), hover, and/or sideward and rearward mobility or flight. In airplane mode, aircraft 100 may be capable of forward flight maneuvers. Additionally, since aircraft 100 is a convertible aircraft, it is also operable in a conversion, or transition, mode when transitioning between the helicopter and airplane modes.

As previously noted, unlike fixed-wing aircraft, VTOL aircraft do not require runways. Instead, VTOL aircraft are capable of taking off, hovering, and landing vertically. As also noted above, helicopters and tiltrotors are examples of VTOL aircraft. Yet another type of VTOL aircraft is commonly referred to as a "tail-sitter" aircraft. As the name implies, a tail-sitter aircraft takes off and lands on its tail, but tilts horizontally for forward flight. As illustrated in the embodiments of FIGS. 1A-1B, aircraft 100 is configured as a tail-sitter aircraft. Being a drone-type aircraft, aircraft 100 is configured for remote control and operation. Additionally, at least in some embodiments, aircraft 100 may be fully autonomous and self-directed via a predetermined or pre-programmed location-based guidance system (e.g., global positioning system ("GPS"), coordinate-based location, street address, etc.). Additionally, aircraft 100 may be a manned aircraft.

In at least one embodiment, aircraft 100 may include a cargo pod 102 that functions as the fuselage, wings 104, vertical supports 105 disposed between the wings 104, tail booms 106, horizontal stabilizers 108 extending from each tail boom 106, and a plurality of pylons, also called nacelles, 110 each comprising a rotor system 112 having a plurality of rotor blades 114. Each combination of a pylon 110 and its associated rotor system 112 comprising rotor blades 114 may be referred to herein as a propulsion assembly 115. Aircraft 100 may also include plurality of aircraft sensors 118 and a control system 120. Wings 104 comprise a substantially parallel, double-wing (sometimes referred to as "biplane") configuration that provides lift to the aircraft 100 during forward flight (e.g., as shown in FIG. 1B) while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 may provide a wider base for landing gear uses. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor (not shown) within each pylon 110. However, in other embodiments, the rotor systems 112 may be driven by a combustion engines or auxiliary power unit through a plurality of interconnect driveshafts and/or auxiliary gearboxes, which may be housed within any portion of an aircraft (e.g., within a pylon, fuselage, combinations thereof, or the like). Furthermore, since aircraft 100 functions as a convertible aircraft, the rotational speeds of each rotor system 112 may be selectively controlled to orient aircraft 100 in the various flight modes.

In various embodiments, control system 120 may include one or more processor(s), memory element(s), network connectivity device(s), storage, input/output (I/O) device(s), combinations thereof, or the like to facilitate operations of each propulsion assembly 115 and/or other electronic systems of aircraft 100. In various embodiments, operation of each propulsion assembly 115 may include controlling the rotational speed of rotor systems 112, adjusting thrust vectors of rotor systems 112, and the like to facilitate vertical lift operations, forward thrust operations, transition operations, combinations thereof, or the like for aircraft 100. In some embodiments, feedback may be received by control system 120 (e.g., via each propulsion assembly 115, one or more sensors 118, etc.) to facilitate or augment various operations of aircraft 100. In various embodiments, sensors 118 may include, but not be limited to, positioning sensors, attitude sensors, speed sensors, environmental sensors, fuel sensors, temperature sensors, location sensors, combinations thereof, or the like.

When aircraft 100 is in a helicopter mode position, rotor systems 112 may provide a vertical lifting thrust for aircraft 100, which may enable hover flight operations to be performed by aircraft 100. When aircraft 100 is in an airplane mode position, rotor systems 112 may provide ±a forward thrust and a lifting force may be supplied by wings 104.

Embodiments described herein include an anti-aircraft system for intercepting and destroying hostile aircraft. In one embodiment, the anti-aircraft system includes an APT aircraft, such as aircraft 100, adapted to include seek-and-destroy capabilities in a low cost manner and with little additional weight. As noted above, an APT is capable of vertical takeoff and landing and can transition to high speed forward flight, allowing the APT to overtake slower moving hostile aircraft, such as rotorcraft and drones. In accordance with features of embodiments described herein, the APT may be augmented with high speed dash capability (e.g., by the addition of chemical rocket motors to pylons, or nacelles, of the APT) to enable the APT to overtake fixed wing aircraft. It is known that the high density and toughness of the battery of a UAV (including an APT) may create a high risk of deep penetration into and damage of a target aircraft in the event of a UAV strike. Embodiments described herein employ that inherent threat and augment the threat by equipping the APT with entrapping features to improve the capability of the APT to deliver an incapacitating strike to a target aircraft. In various embodiments, the battery may be housed in the fuselage (e.g., cargo pod 102), one or more of nacelles 110, and/or wings 104.

In certain embodiments, certain ones of pylons of the APT include release mechanisms and internal cabling such that the pylons may be ejected from and remain tethered to the APT thereby to increase the impact radius of the anti-aircraft system, enabling a greater ability to interfere with safe operation of the target aircraft. This allows the anti-aircraft system to strike and foul anti-rotation capability of the tail rotor of the target aircraft. Alternative target points can include the canopy or air intakes of the target aircraft.

Figure 2:
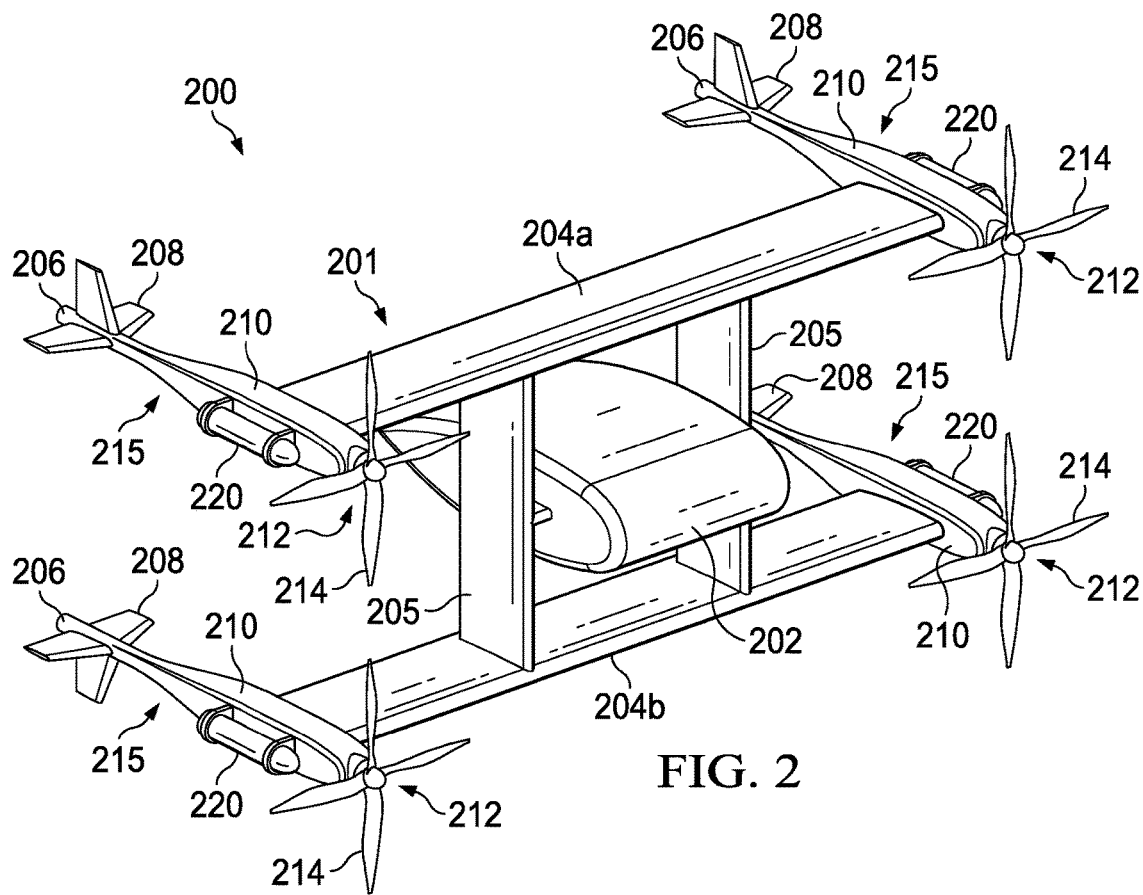
FIG. 2 illustrates a UAV configured for use in anti-aircraft applications in accordance with embodiments described herein.

Referring now to FIG. 2, illustrated therein is an anti-aircraft system 200 embodying features of embodiments described herein. As shown in FIG. 2, the system 200 includes an aircraft 201, which in the illustrated embodiment is an APT. Aircraft 201 is similar in all relevant requests to aircraft 100. In particular, aircraft 201 may include a cargo pod 202 that functions as the fuselage, upper and lower wings 204a, 204b, respectively, vertical supports 205 disposed between the wings 204a, 204b, tail booms 206, horizontal stabilizers 208 extending from each tail boom 206, and a plurality of pylons 210 each comprising a rotor system 212 having a plurality of rotor blades 214. Each combination of a pylon 210 and its associated rotor system 212 comprising rotor blades 214 may be referred to herein as a propulsion assembly 215. Although not shown in FIG. 2, similar to aircraft 100, aircraft 201 may also include plurality of aircraft sensors and a control system. Wings 204a, 204b comprise a substantially parallel, double-wing (sometimes referred to as "biplane") configuration that provides lift to the aircraft 201 during forward flight while also maintaining a smaller footprint of the aircraft when the aircraft is on the ground. Vertical supports 205 are disposed on each side of the cargo pod 202 and affixed between the wings 204a, 204b to provide structure and support to the wings 204a, 204b. The cargo pod 202 is generally positioned between the wings 204a, 204b and the vertical supports 205. In the embodiment shown, the cargo pod 202 is affixed to the vertical supports 205. However, in other embodiments, the cargo pod 202 may be affixed to the wings 204a, 204b or both the wings 204a, 204b and vertical supports 205. Additionally, while two vertical supports 205 are shown, in some embodiments, aircraft 201 may comprise more vertical supports 205 depending on the configuration of the aircraft 201.

Tail booms 206 are disposed on the outboard ends of each wing 204a, 204b. The tail booms 206 are curved at the aft ends to provide stabilization to the aircraft 201 during forward flight in a manner substantially similar as other tail surfaces known in the art, while also doubling as a landing gear for the aircraft 201. As such the curved ends of the tail booms 206 may provide a wider base for landing gear uses. Each tail boom 206 also comprises a pair of horizontal stabilizers 208 coupled to each of an inner and outer surface of the tail boom 206. The horizontal stabilizers 208 function to provide stabilization to the aircraft 201 during forward flight in a manner substantially similar as horizontal stabilizers known in the art. Pylons 210 are disposed on outboard sides of each tail boom 206 proximate the outboard end of each wing 204a, 204b. Each pylon 210 comprises a selectively rotatable rotor system 212 having a plurality of rotor blades 214 coupled thereto. In the embodiment shown, each rotor system 212 is driven by an associated electric motor (not shown) within each pylon 210. However, in other embodiments, the rotor systems 212 may be driven by a combustion engines or auxiliary power unit through a plurality of interconnect driveshafts and/or auxiliary gearboxes, which may be housed within any portion of an aircraft (e.g., within a pylon, fuselage, combinations thereof, or the like).

Furthermore, since aircraft 201 functions as a convertible aircraft, the rotational speeds of each rotor system 212 may be selectively controlled to orient aircraft 201 in the various flight modes.

When aircraft 201 is in a helicopter mode position, rotor systems 212 may provide a vertical lifting thrust for aircraft 201, which may enable hover flight operations to be performed by aircraft 201. When aircraft 201 is in an airplane mode position, rotor systems 212 may provide ±a forward thrust and a lifting force may be supplied by wings 204a, 204b.

In accordance with features of embodiments described herein, aircraft 201 may be augmented with high speed dash capability to enable aircraft to overtake fixed wing aircraft, as well as rotorcraft, for purposes to be described hereinbelow. As shown in FIG. 2, this may be accomplished by the addition of chemical rocket motors 220 to pylons 210. Firing up of rocket motors 220 when aircraft 201 is in forward flight mode increases the speed thereof such that it may be comparable to that of a fixed wing aircraft.

As previously noted, in accordance with features of certain embodiments described herein, one or more pairs of pylons 210 of aircraft 201 include release mechanisms and internal cabling such that the pylons 210 may be ejected from and remain tethered to aircraft 201 (specifically, wings 204a, 204b, thereof) to increase the impact radius of the anti-aircraft system 200, enabling a greater ability to interfere with safe operation of a target aircraft. This allows the anti-aircraft system 200 to strike and foul anti-rotation capability of the tail rotor of the target aircraft. Alternative target points can include the canopy or air intakes of the target aircraft.

Figure 3:
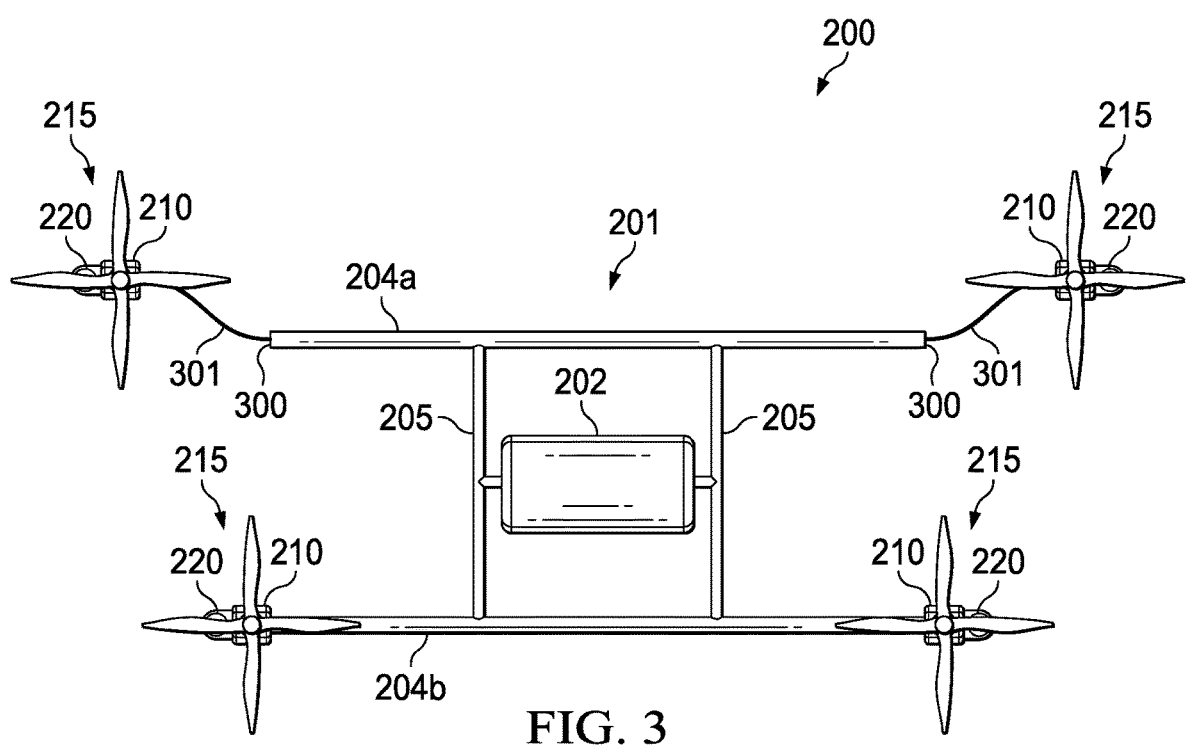
FIG. 3-6 illustrate various aspects of operation of the UAV of FIG. 2 after pylons have been released in accordance with embodiments described herein.

FIG. 3 illustrates a front elevational view of aircraft 201 in which the pylons 210 associated with upper wing 204a have been released, or ejected, from tips 300 of upper wing 204a for purposes to be described in greater detail hereinbelow. Released pylons 210 remain tethered to tips 300 of wing 204a via cabling 301. Propulsion systems 215 comprising the released pylons 210 continue to propel the pylons 210 in a primarily forward direction (i.e., the same direction as aircraft 201) with or without aid of the corresponding rocket motors 220 and as restricted by cabling 301. Aircraft 201 continues in a primarily forward direction as propelled by propulsion systems 215 that remain attached to the lower wing 204b. It will be recognized that, although pylons associated with upper wing are shown as being released from and cabled to aircraft 201, in alternative embodiments, pylons 210 (and thus propulsion systems 215) associated with lower wing 204b may be released or ejected instead, with propulsion systems 215 associated with upper wing 204a remaining attached thereto to propel the aircraft 201.

Figure 4:
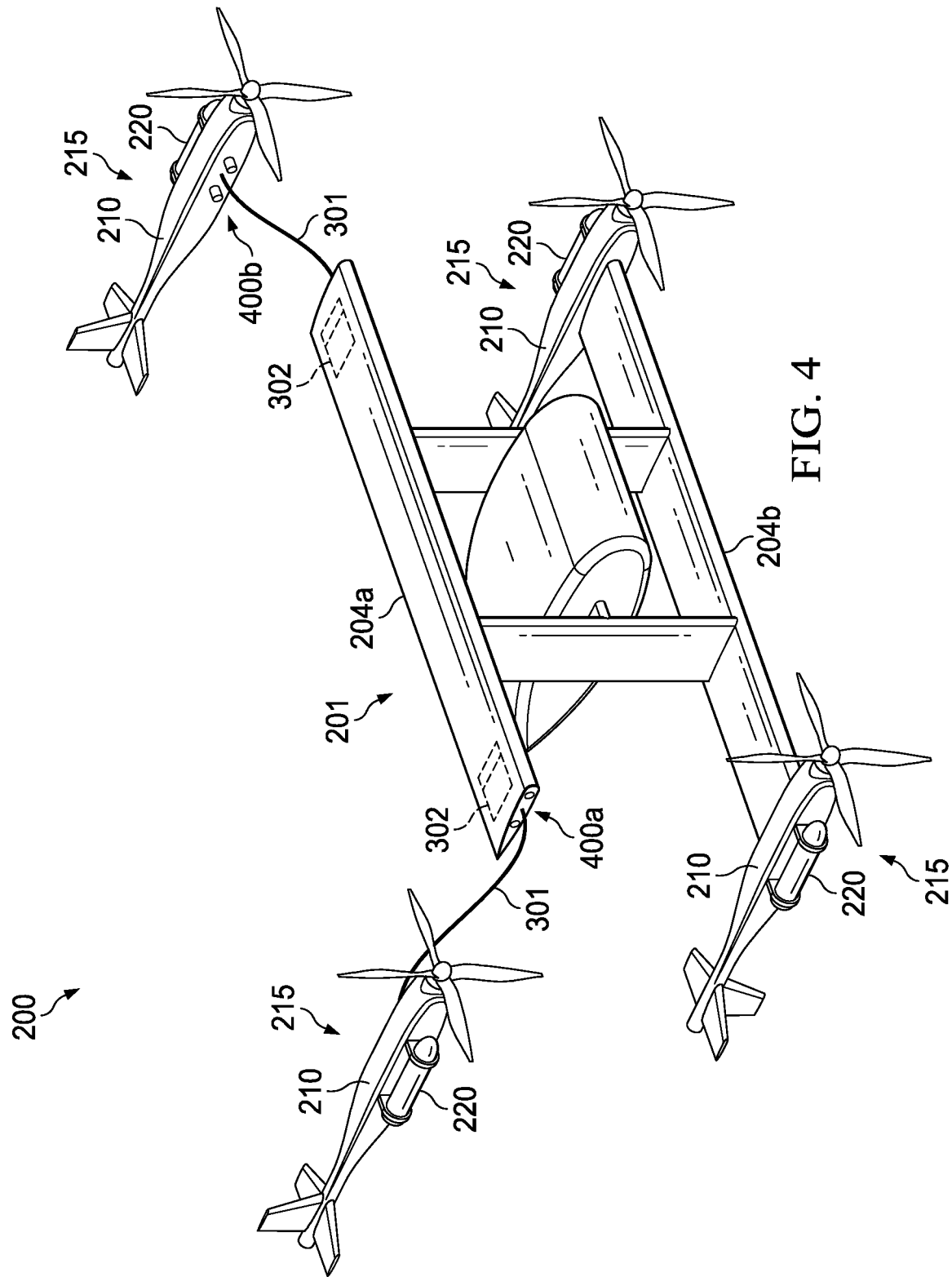

FIG. 4 is a perspective view of the aircraft 201 after deployment of pylons 210/propulsion systems 215 as described with reference to FIG. 3 and illustrating example release mechanisms for releasing pylons 210 from opposite tips 300 of wing 204a. As shown in FIG. 4, the example release mechanisms may include a female receptacle portion 400a disposed on outboard edge surfaces of wing tips 300 and a male plug portion 400b disposed on inboard sides of pylons 210 for mating with the corresponding female receptacle portion 400a. In accordance with features of embodiments described herein, one or more actuators 302 may be disposed interior to wing 204a proximate wing tips 400 for causing male receptacle portions 400b to disengage (or be ejected) from female receptacle portions 400a in response to control signals from the aircraft control system to liberate the pylons 210/propulsion systems 215 from upper wing 204a and aircraft 201. As previously described, released propulsions systems 215 remain tethered to aircraft 201 subsequent to release thereof by cabling 301.

Figure 5A:
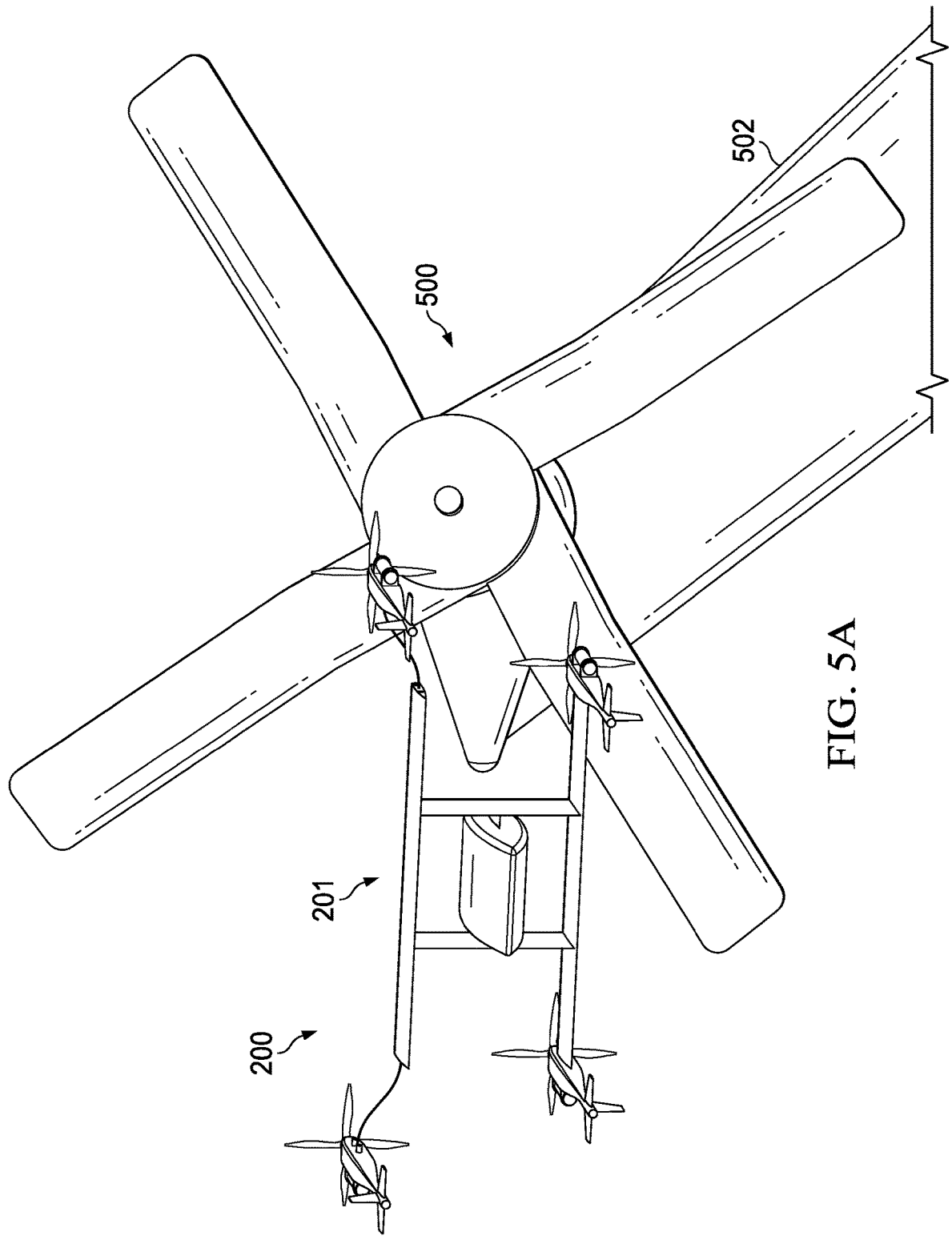
Figure 5B:
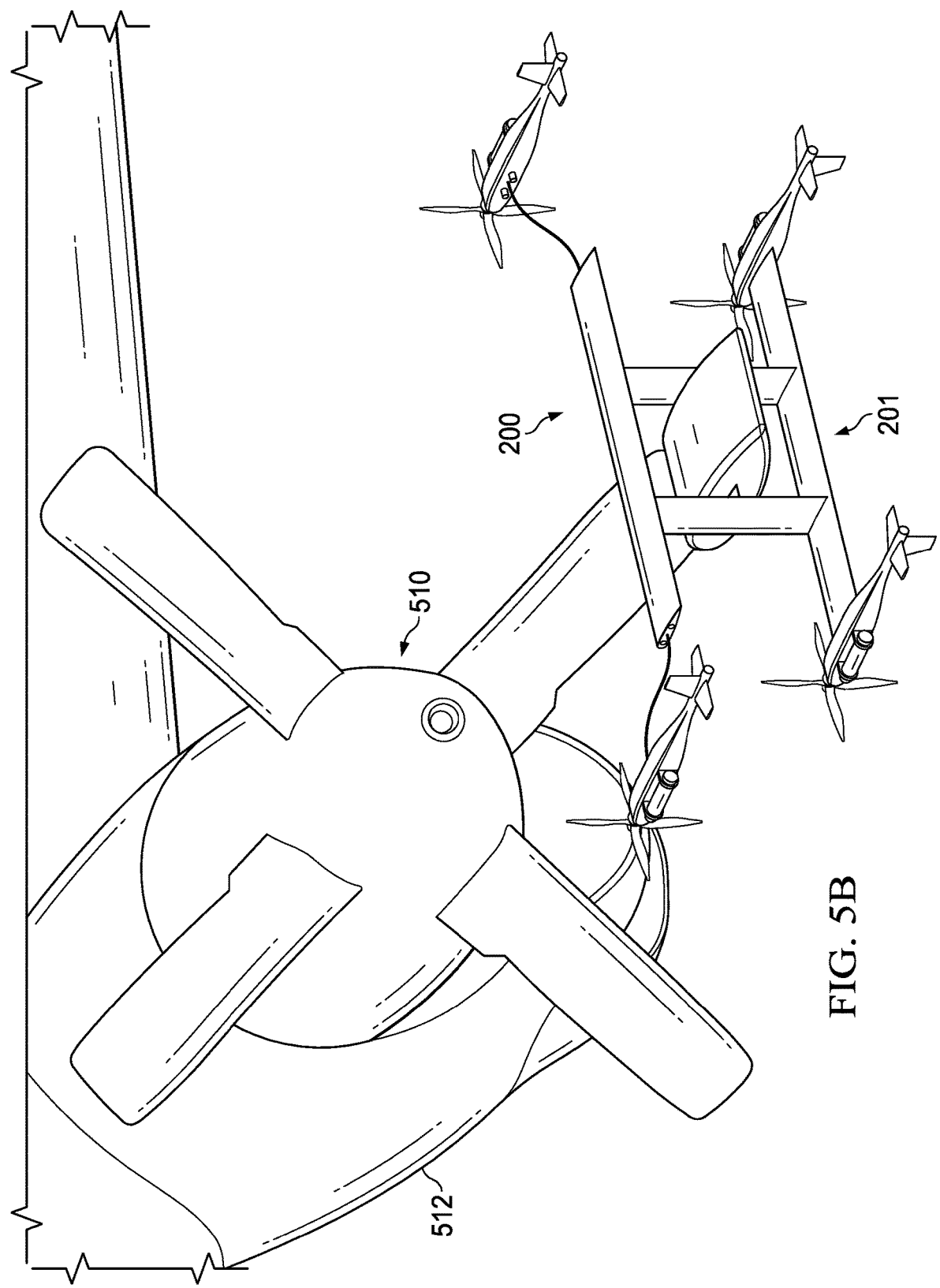
Figure 6:
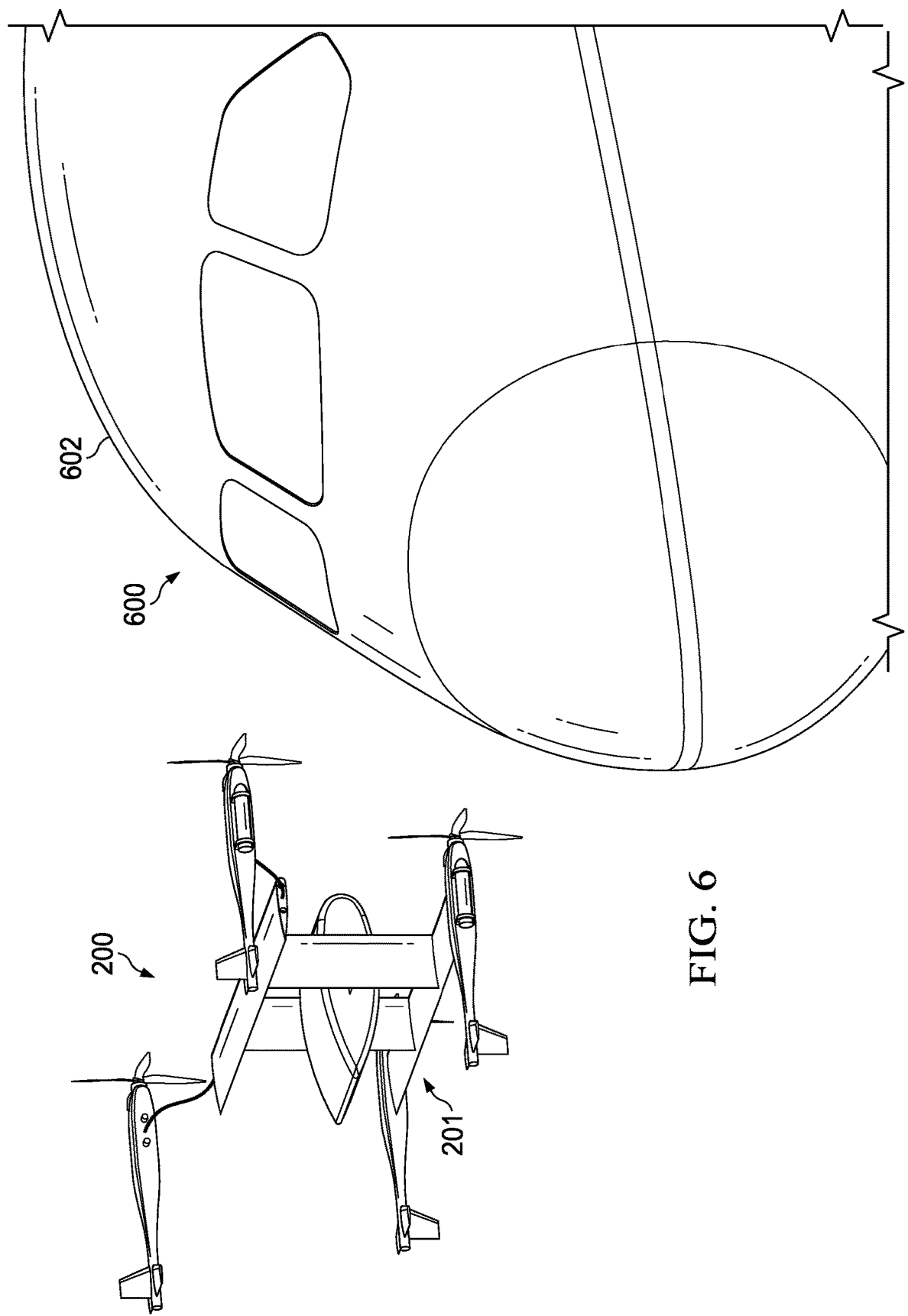

As previously noted, and as illustrated in FIGS. 5A, 5B, and 6 described below, releasing certain ones of pylons 210 and associated propulsion assemblies 215 from aircraft 201 while keeping them tethered to aircraft 201 via cabling 301 increases an effective impact radius of the anti-aircraft system 200, enabling a greater ability to interfere with safe operation of a target aircraft.

FIG. 5A illustrates an example use of anti-aircraft system 200 comprising aircraft 201 for striking and fouling anti-rotation capability of a tail rotor 500 of a target aircraft 502. FIG. 5B illustrates an example use of anti-aircraft system 200 for striking and interfering with an air intake system 510 of a target aircraft 512. FIG. 6 illustrates an example use of anti-aircraft system 200 for directly striking and destroying a canopy 600 of a target aircraft 602. It will be recognized that the strikes illustrated in any of FIGS. 5A, 5B, and 6, would function to effectively disrupt operation of the target aircraft, resulting in downing and/or destruction of the target aircraft.

Figure 7A:
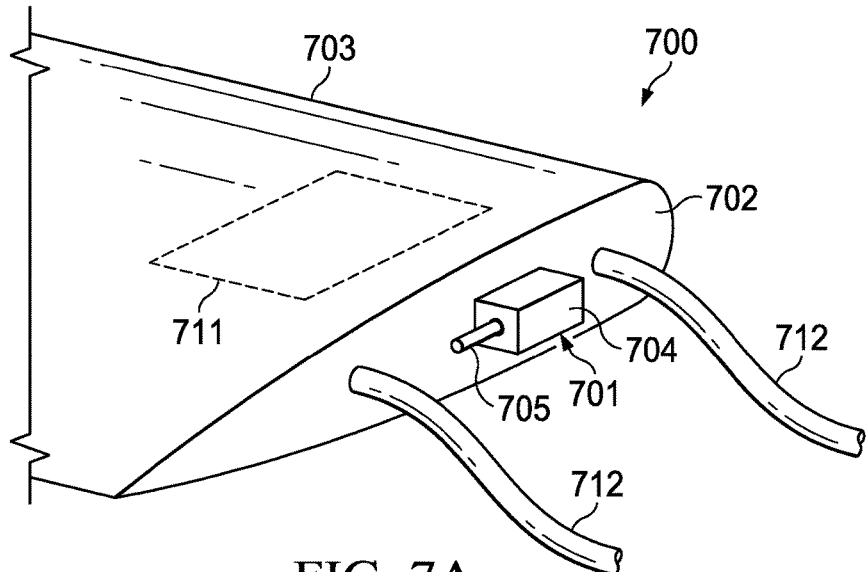
FIGS. 7A and 7B illustrate an example mechanism for selectively releasing pylons from the UAV of FIG. 2 in accordance with embodiments described herein.
Figure 7B:
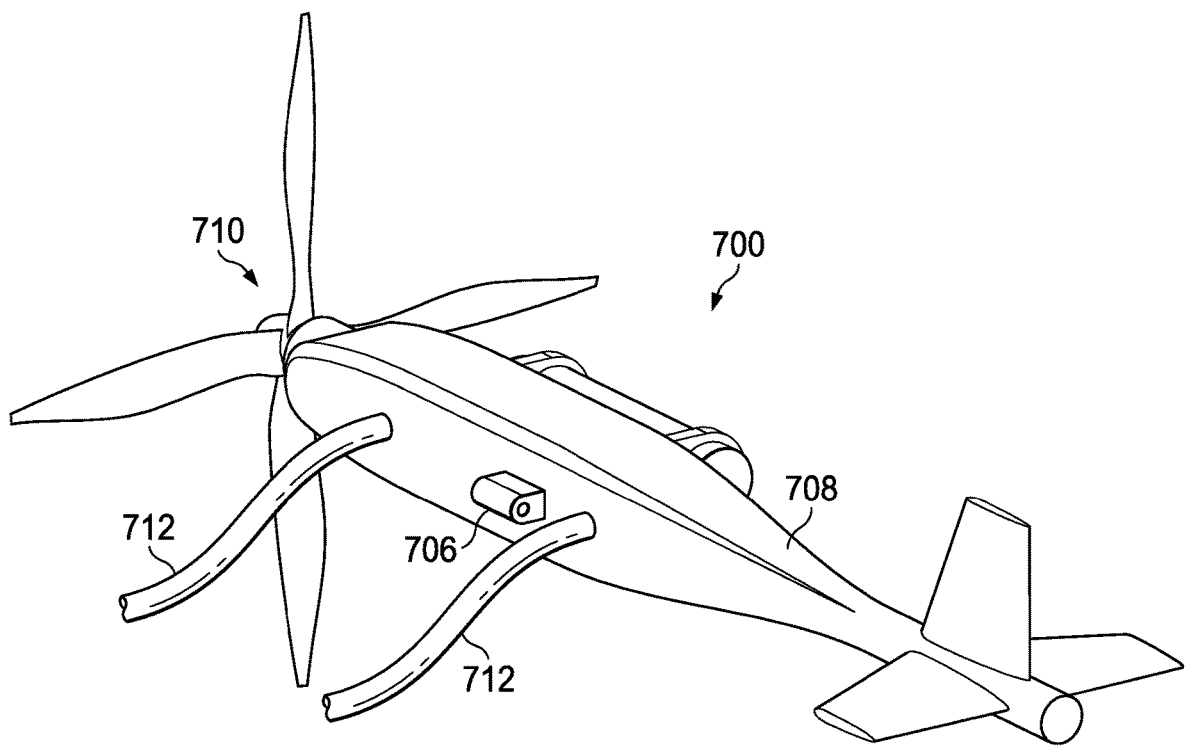

FIGS. 7A and 7B illustrate an alternative example release mechanism for use in connection with an anti-aircraft system 700, which is similar in all relevant respects to anti-aircraft system 200. As shown in FIGS. 7A and 7B, a retention/release mechanism 701 may be disposed on an outboard end of a tip 702 of a wing 703. In the illustrated embodiment, retention/release mechanism 701 includes a housing portion 704 and an extension portion 705 for mating with a receptacle 706 disposed on an inboard side of a pylon 708, which comprises a portion of a propulsion system 710. An actuator is disposed within the housing portion 704 for selectively actuating the retention/release mechanism 701 in accordance with control signals from a control system (not shown in FIGS. 7A, 7B). In particular, during retention operation, extension portion 705 is retained within receptacle 706 such that pylon 708/propulsion system 710 are connected to wing 703. When the pylon 708/propulsion system 710 is to be released from wing 703, such as for purposes described hereinabove, extension portion 705 is retracted within housing portion 704, and thus retracted from receptacle 706, thereby releasing pylon 708/propulsion system 710 from wing 703. Pylon 708/propulsion system 710 remains tethered to wing 703 by cables 712. It will be recognized that, although not explicitly shown in the figures, wiring for carrying power, control, and/or other signals to and from propulsion system 710 may also be provided between the wing 703 and the pylon 708 in a length and configuration similar to cables 712 for tethering the pylon 708 to the wing 703.

In general, retention/release mechanisms, such as mechanism 701, must be strong enough to resist flight loads and aggressive maneuvers. Additionally, it must be capable of carrying most of the load in shear. For example, in the case of the cable mechanism, it would be tension, however, the load should be carried in the most efficient way from the materials used in the particular implementation. The mechanism 701 should be designed to limit load on the actuator itself. In the embodiment illustrated in FIGS. 7A and 7B, the pin carries the load in shear, while the actuator carries the retraction load. Finally, the mechanism should be designed such that it is locked into retention mode in the event of a failed actuator.

Figure 8A:
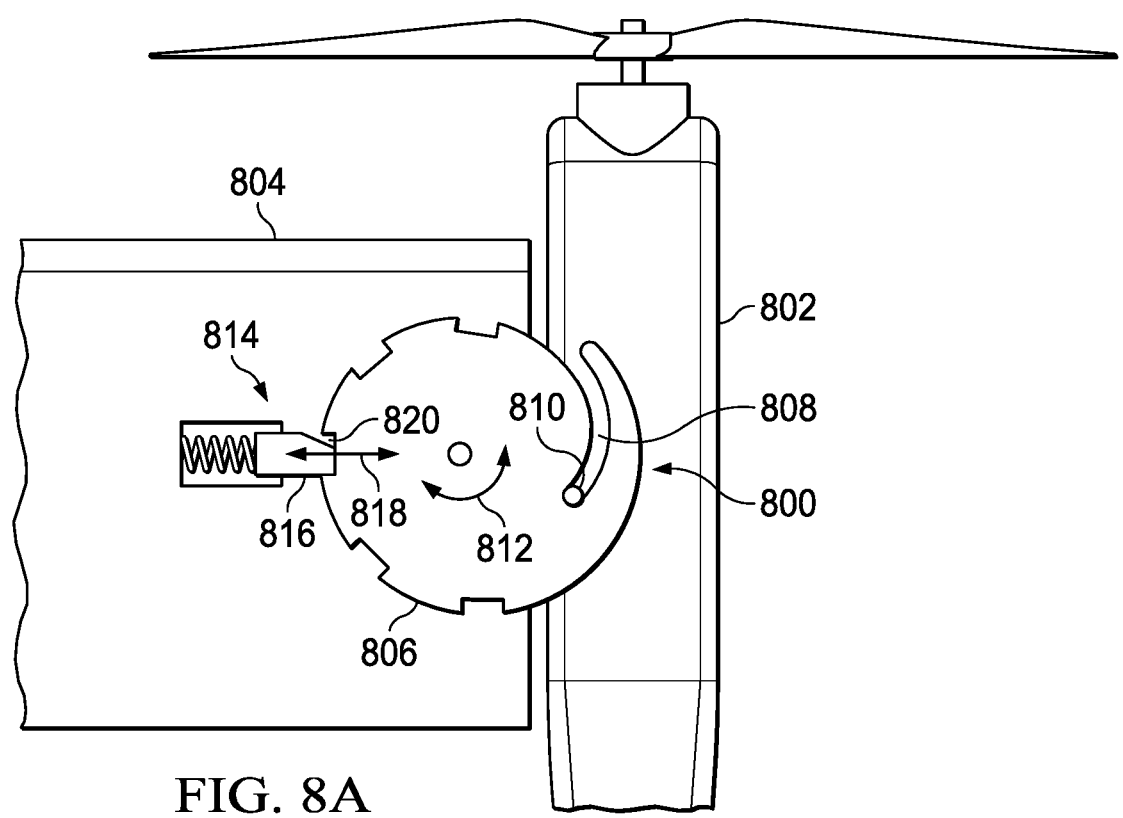
FIGS. 8A-8C illustrate example mechanisms for selectively releasing pylons from a UAV in accordance with alternative embodiments described herein.
Figure 8B:
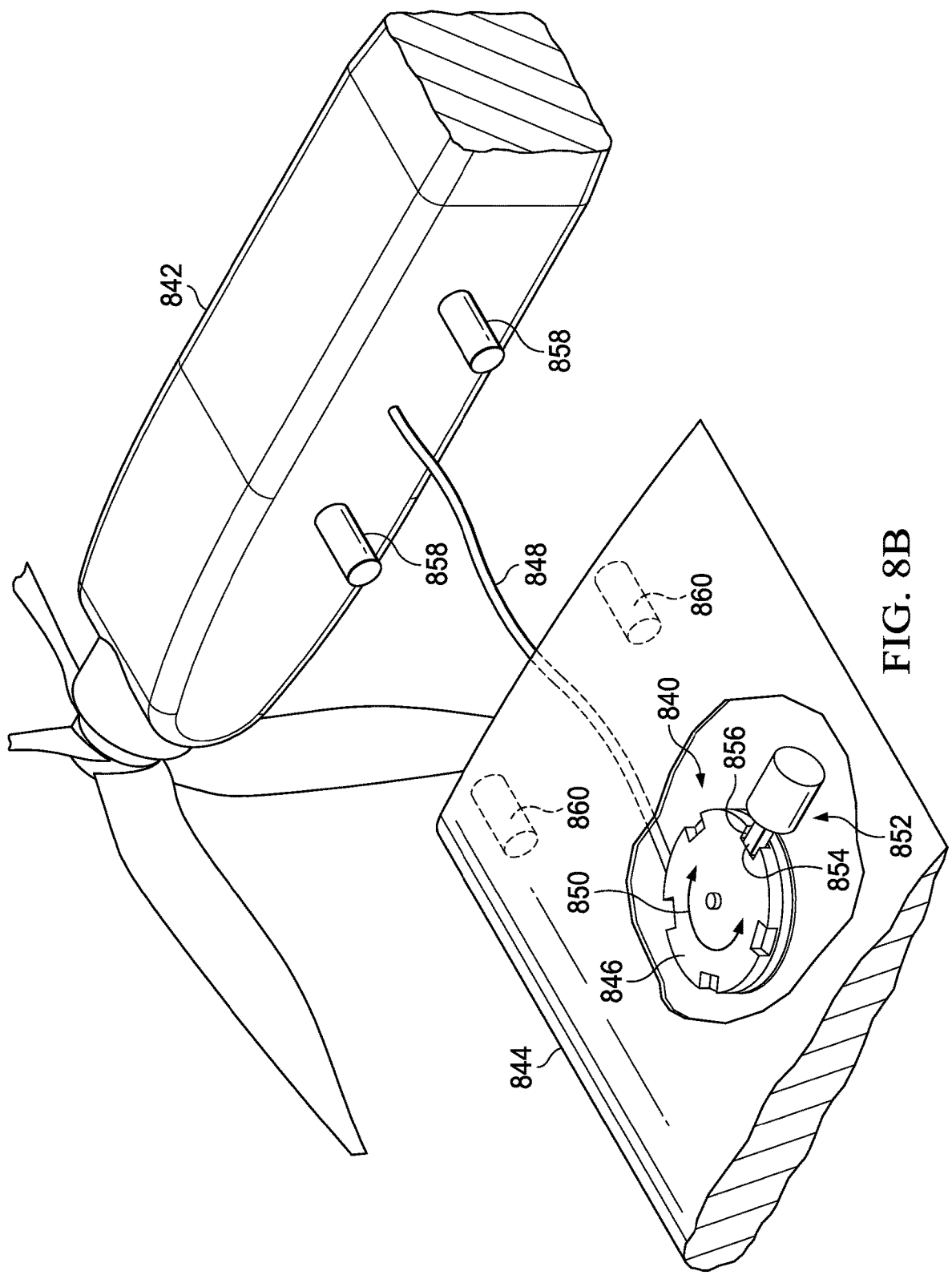
Figure 8C:
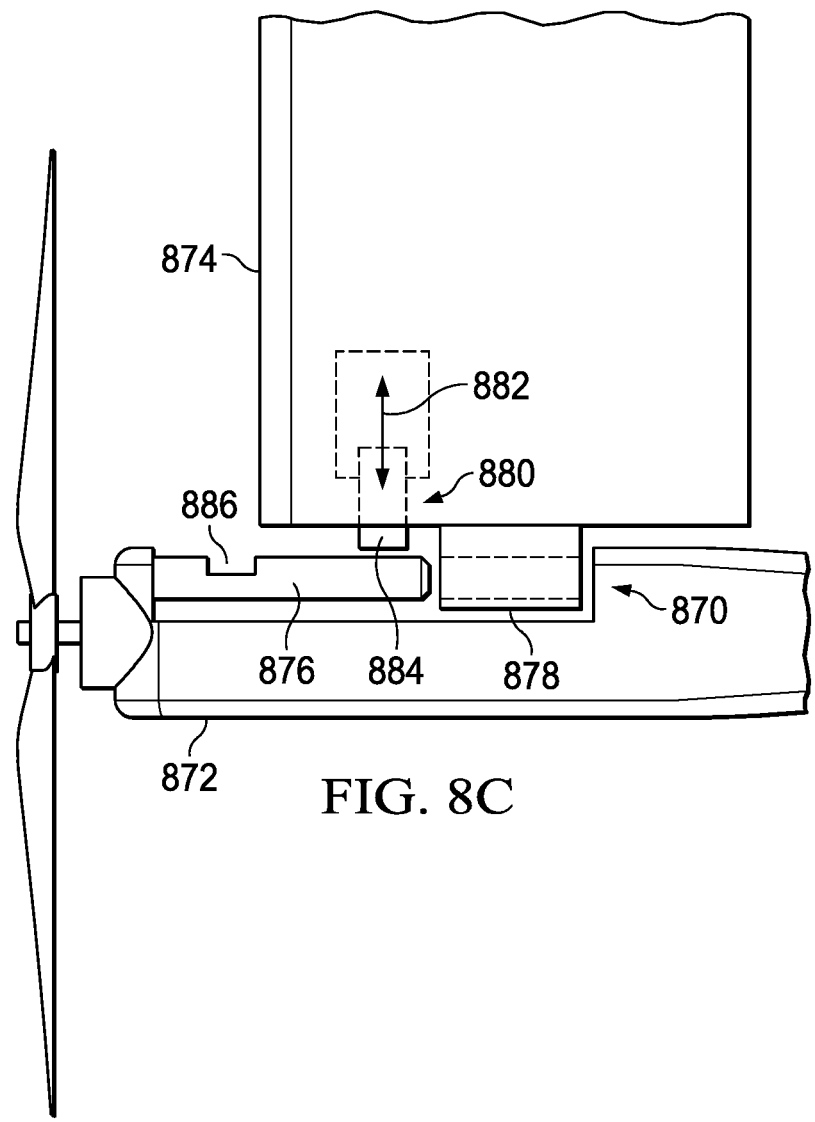

FIGS. 8A-8C illustrate example mechanisms for selectively releasing pylons from a UAV in accordance with alternative embodiments described herein. Referring to FIG. 8A, illustrated therein is a retention/release mechanism 800 for retaining a pylon 802 in connection with a wing 804 and selectively releasing the pylon from the wing in accordance with an embodiment. The retention/release mechanism 800 comprises a rotating lock portion 8 including a slot 808 for receiving a pin 810 connected to or integrated into the pylon 802. As will be described, rotating lock portion 806 is rotatably connected to the wing 804 and may be rotated clockwise and counterclockwise about a connection point, as represented by an arrow 812, via a small electric motor, to secure the pin 810 within the slot 808 (as shown) or to release the pin from the slot by rotating the lock portion 806 in a clockwise direction. In certain embodiments, depending on the implementation, a small reduction gear may be used. Once the pylon 802 is secured in place by the rotating lock portion 806, as shown in FIG. 8A, a plunger mechanism 814 functions as a physical lock to take the load off the motor. The plunger mechanism 814 includes a spring loaded plunger 816 that may be actuated forward and backward, as represented by an arrow 818, into a notch 820 disposed in the rotating lock portion 806, when the pylon 802 is secured to the wing 804, and out of the notch 820 to allow the rotating lock portion 806 to rotate and release the pylon 802 from the wing 804.

Referring to FIG. 8B, illustrated therein is a retention/release mechanism 840 for retaining a pylon 842 in connection with a wing 844 and selectively releasing the pylon from the wing in accordance with an embodiment. The retention/release mechanism 840 comprises a motor driven winch 846 using cable tension 848 to secure and release the pylon 842. As shown in FIG. 8B, winch 846 rotates clockwise and counterclockwise, as represented by an arrow 850, around a connection point to selectively increase or reduce tension on cable 848 that secures the pylon 842 to the wing 844. A plunger mechanism 852 performs a function similar to that of plunger mechanism 814 (FIG. 8A), to take the load off the winch 846. In particular, plunger mechanism 852 includes a plunger 854 designed to be received in/retracted from notches, such as notch 856, in the winch 846. Pins 858 are provided along an edge of the pylon 842 and are designed to be received into receptacles 860 provided along an outboard edge of wing 844 to align, index, and share flight loads between the wing and pylon.

Referring to FIG. 8C, illustrated therein is a retention/release mechanism 870 for retaining a pylon 872 in connection with a wing 874 and selectively releasing the pylon from the wing in accordance with an embodiment. The retention/release mechanism 870 includes a rod 876 disposed on the pylon 872 and a sleeve 878 for receiving the rod 876 disposed on the outboard end of the wing 874. A plunger mechanism 880 performs a function similar to that of plunger mechanism 814 (FIG. 8A). In particular, plunger mechanism 880 includes a plunger 884 designed to be selectively received in/retracted from a notch 886 disposed the rod 876, as indicated by an arrow 882, to respectively cause the rod 876 to be retained within the sleeve 878 (and thus secure the pylon 872 to the wing 874) or allow the rod 876 to be released from the sleeve 878 (and thus releasing the pylon 872 from the wing 874).

It will be recognized that the mechanism 870 requires that the pylon 872 and wing 874 move at different speeds in order to disengage from one another; in particular, the pylon 872 will need to move more slowly to allow the rod 876 to be released from the sleeve. This may be accomplished by cutting power to the rotor associated with the pylon 872; however, the rotor could interfere with clearing the wing. Alternatively, the wing may fall away, in which case the rotors of the pylons separating from the aircraft will need to momentarily produce more thrust than the rotors of the pylons remaining connected to the aircraft. This will allow drag on the aircraft body to create the reaction force such that the pylon can pull free due to the high thrust of the rotors.

It should be noted that, while aircraft 100, 201, are illustrated as including four pylons/propulsion systems, embodiments described herein may be advantageously implemented in aircraft having more or fewer pylons/propulsion systems without departing from the spirit and scope of the present disclosure. Additionally, while pairs of pylons/propulsions systems disposed on opposite ends of the same wing are shown as being released or retained (i.e., deployed) together, non-paired pylons/propulsion systems may be deployed together or a single pylon/propulsion system may be deployed.

Example 1 is an unmanned aerial vehicle (UAV) including a body; a wing connected to the body; and propulsion systems associated with the wing, wherein the propulsion systems comprise pylons releasably connected to opposite ends of the wing such that the propulsion systems may be selectively released from the wing during flight of the UAV.

In Example 2, the UAV of Example 1 may further include cables for tethering the pylons to opposite ends of the wings when the pylons are in a released condition.

In Example 3, the UAV of any of Examples 1-2 may further include release mechanisms for releasing the pylons from the opposite ends of the wing.

In Example 4, the UAV of any of Examples 1-3 may further include an actuator associated with the release mechanisms for causing the release mechanisms to release the pylons from the opposite ends of the wings.

In Example 5, the UAV of any of Examples 1-4 may further include a control system for controlling operation of the actuator.

In Example 6, the UAV of any of Examples 1-5 may further include the actuator including an actuator associated with each of the release mechanisms.

In Example 7, the UAV of any of Examples 1-6 may further include a second wing connected to the body; and propulsion systems associated with the second, wherein the propulsion systems comprise pylons permanently connected to opposite ends of the second wing.

In Example 8, the UAV of any of Examples 1-7 may further include rocket motors connected to the pylons for enabling the UAV to operate in dash mode.

Example 9 is an anti-aircraft system comprising an unmanned aerial vehicle (UAV) including a body; a wing connected to the body; and propulsion systems associated with the wing, wherein the propulsion systems comprise pylons releasably connected to opposite ends of the wing such that the propulsion systems may be selectively released from the wing during flight of the UAV.

In Example 10, the anti-aircraft system of Example 9 may further include the UAV further including cables for tethering the pylons to opposite ends of the wings when the pylons are in a released condition.

In Example 11, the anti-aircraft system of any of Examples 9-10 may further include the UAV further including release mechanisms for releasing the pylons from the opposite ends of the wing.

In Example 12, the anti-aircraft system of any of Examples 9-11 may further include the UAV further including an actuator associated with the release mechanisms for causing the release mechanisms to release the pylons from the opposite ends of the wings.

In Example 13, the anti-aircraft system of any of Examples 9-12 may further include the UAV further including a control system for controlling operation of the actuator.

In Example 14, the anti-aircraft system of any of Examples 9-13 may further include the actuator including an actuator associated with each of the release mechanisms.

In Example 15, the anti-aircraft system of any of Examples 9-14 may further include the UAV further including second wing connected to the body; and propulsion systems associated with the second, wherein the propulsion systems comprise pylons permanently connected to opposite ends of the second wing.

In Example 16, the anti-aircraft system of any of Examples 9-15 may further include the UAV further including rocket motors connected to the pylons for enabling the UAV to operate in dash mode.

In Example 17, the anti-aircraft system of any of Examples 9-16 may further include the UAV further comprising a tail-sitter aircraft.

Example 18 is a method of operating an unmanned aerial vehicle to implement an anti-aircraft system, the method including propelling the UAV toward a target aircraft; releasing propulsion systems connected to opposite ends of a wing of the UAV, wherein the propulsion systems remain connected to the opposite ends of the wing after release thereof via cables; and striking the target aircraft in an identified location of the target aircraft.

In Example 19, the method of Example 18 may further include the identified location of the target aircraft comprising at least one of a tail rotor, an air intake, and a canopy identifying a target aircraft.

In Example 20, the method of any of Examples 18-19 may further include the target aircraft including at least one of a rotorcraft and a fixed wing aircraft.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An unmanned aerial vehicle (UAV) comprising:
a body having a top surface and a bottom surface opposite the top surface;
first and second wings connected to the body, wherein one of the first and second wings is connected above the top surface of the body and the other one of the first and second wings is connected below the bottom surface of the body;
a first pair of propulsion systems connected to the first wing for propelling the UAV, wherein the first pair of propulsion systems comprise pylons releasably connected to opposite outboard ends of the first wing such that the first pair of propulsion systems are selectively releasable from the first wing during a flight of the UAV;
flexible cables for tethering the pylons to the opposite outboard ends of the first wing when the pylons are in a released condition;
a second pair of propulsion systems connected to the second wing for propelling the UAV, wherein the second pair of propulsion systems are fixedly connected to opposite outboard ends of the second wing; and
a controller configured to attack a target aircraft by releasing the first pair of propulsion systems such that the first pair of propulsion systems function as an anti-aircraft system;
wherein the second pair of propulsion systems propel the UAV in a generally forward direction.

2. The UAV of claim 1 further comprising:
release mechanisms for releasing the pylons from the opposite ends of the first wing.

3. The UAV of claim 2 further comprising:
an actuator associated with the release mechanisms for causing the release mechanisms to release the pylons from the opposite ends of the first wing.

4. The UAV of claim 3 further comprising a control system for controlling operation of the actuator.

5. The UAV of claim 3, wherein the actuator comprises an actuator associated with each of the release mechanisms.

6. The UAV of claim 1 further comprising:
rocket motors connected to the pylons for enabling the UAV to operate in dash mode.

7. The UAV of claim 1, further comprising curved tail booms connected to the outboard opposite ends of the first and second wings.

8. The UAV of claim 7, wherein each of the curved tail booms comprises:
a first horizontal stabilizer connected to an inboard side of the curved tail boom; and
a second horizontal stabilizer connected to an outboard side of the curved tail boom.

9. An anti-aircraft system comprising:
an unmanned aerial vehicle (UAV) comprising:
a body having a top surface and a bottom surface opposite the top surface;
first and second wings connected to the body, wherein one of the first and second wings is connected above the top surface of the body and the other one of the first and second wings is connected below the bottom surface of the body;
propulsion systems connected to the first and second wings for propelling the UAV, wherein at least one of the propulsion systems comprises a pylon releasably connected to an outboard end of the one of the wings such that the propulsion system may be selectively released from the outboard end of the one of the wings during a flight of the UAV;
at least one tether for tethering the at least one pylon to the outboard end of the one of the wings when the at least one pylon is in a released condition; and
a controller configured to attack a target aircraft by releasing the at least one of the propulsion systems such that the at least one of the propulsion systems functions as an anti-aircraft system;
wherein at least one other one of the propulsion systems propels the UAV.

10. The anti-aircraft system of claim 9, wherein the UAV further comprises:
a release mechanism for releasing the at least one pylon from the outboard end of the one of the first and second wings.

11. The anti-aircraft system of claim 10, wherein the UAV further comprises:

an actuator associated with the release mechanism for causing the release mechanism to release the at least one pylon from the outboard end of the one of the first and second wings.

12. The anti-aircraft system of claim 11, wherein the UAV further comprises:
a control system for controlling operation of the actuator.

13. The anti-aircraft system of claim 9, wherein the at least one other one of the propulsion systems comprises a pylon permanently connected to the outboard end of the one of the first and second wings.

14. The anti-aircraft system of claim 9, wherein the UAV further comprises:
rocket motors connected to the pylons for enabling the UAV to operate in a dash mode.

15. The anti-aircraft system of claim 9, wherein the UAV comprises a tail-sitter aircraft.

16. The anti-aircraft system of claim 9, wherein the UAV further comprises curved tail booms connected to the outboard ends of the first and second wings.

17. The anti-aircraft system of claim 16, wherein each of the curved tail booms comprises:
a first horizontal stabilizer connected to an inboard side of the curved tail boom; and
a second horizontal stabilizer connected to an outboard side of the curved tail boom.

* * * * *